(12) United States Patent
Luu et al.

(10) Patent No.: US 11,509,604 B1
(45) Date of Patent: Nov. 22, 2022

(54) ENFORCEMENT OF TIME-BASED USER ACCESS LEVELS FOR COMPUTING ENVIRONMENTS

(71) Applicant: INCONTACT INC., Sandy, UT (US)

(72) Inventors: Jon Luu, Sandy, UT (US); Madan Bhattarai, Sandy, UT (US); Travis T. Yates, Salt Lake City, UT (US)

(73) Assignee: INCONTACT INC., Sandy, UT (US)

( * ) Notice: Subject to any disclaimer, the term of this patent is extended or adjusted under 35 U.S.C. 154(b) by 92 days.

(21) Appl. No.: 17/318,160

(22) Filed: May 12, 2021

(51) Int. Cl.
| | |
|---|---|
| *H04L 29/06* | (2006.01) |
| *H04L 47/70* | (2022.01) |
| *H04L 47/78* | (2022.01) |
| *H04L 47/762* | (2022.01) |
| *H04L 47/74* | (2022.01) |
| *G06F 21/62* | (2013.01) |
| *H04L 9/40* | (2022.01) |

(52) U.S. Cl.
CPC ........... *H04L 47/828* (2013.01); *G06F 21/62* (2013.01); *H04L 47/748* (2013.01); *H04L 47/762* (2013.01); *H04L 47/788* (2013.01); *H04L 47/822* (2013.01); *H04L 47/827* (2013.01); *H04L 63/10* (2013.01); *G06F 2221/2137* (2013.01); *G06F 2221/2141* (2013.01)

(58) Field of Classification Search
CPC ............ G06F 21/62; G06F 2221/2137; G06F 2221/2141; H04L 63/10
See application file for complete search history.

(56) References Cited

U.S. PATENT DOCUMENTS

| | | | |
|---|---|---|---|
| 9,799,153 B1* | 10/2017 | Worrall ............... | G07C 9/22 |
| 2012/0042366 A1* | 2/2012 | Jin ..................... | G16H 40/20 726/19 |
| 2015/0150101 A1* | 5/2015 | Novack ................ | G07C 9/28 726/3 |
| 2016/0103593 A1* | 4/2016 | Wynne, IV .......... | G06F 30/00 715/771 |
| 2020/0344238 A1* | 10/2020 | Ainsworth ........... | A61B 5/165 |

\* cited by examiner

*Primary Examiner* — Jason K Gee
(74) *Attorney, Agent, or Firm* — Haynes and Boone, LLP

(57) ABSTRACT

A system is provided for enforcing time-based user access levels in a computing infrastructure of an organization. The system includes a processor and a computer readable medium operably coupled thereto, to perform operations which include executing a synchronization of the time-based user access levels, obtaining a first login identifier (ID) of a plurality of login IDs for a group of employees of the organization, identifying a position ID and an employment status ID for the first login ID, determining a current time and a last login timestamp for the first login ID, determining a time-based access rule for the group of employees, determining whether a time period from the last login timestamp to the current time violates the time-based access rule, and setting, for the synchronization of the first login ID, at least a first access level of the first login ID to computing resources.

20 Claims, 6 Drawing Sheets

ENFORCEMENT OF TIME-BASED USER ACCESS LEVELS FOR COMPUTING ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a cloud or on-premises computing system that may manage user access levels to computing processes, and more specifically to a system and method for synchronizing time-based user access levels to enforce time-based access rules across an organization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A computing system may be provided to enforce time-based user access levels in a computing infrastructure of an organization. The organization may correspond to a company or other entity that requires workforce tracking and management solutions for agents and/or other employees of the organization. For example, employees may correspond to a workforce of the organization, such as call center and/or digital communication channel agents that may be involved in sales, help or assistance, or the like. However, other organizations may provide other services and employees may differ in their capabilities, jobs, and positions. When providing computing services to employees, the computing system may provide different applications and/or computing infrastructures that allow for use of the computing services. Access to different computing services may be delegated by management and administrators, and may be based on the user's employment status and/or position. However, access management to services remains an issue for compliance and security. For example, employees provided with temporary access to particular services and/or data may retain their access after completion of their task and/or when they are no longer employees.

The existing solutions do not provide an automated manner to synchronize and enforce access management across computing systems and infrastructures. An automated system may ensure that compliance standards and requirements are enforced, while further securing data and computing services for the organization. Furthermore, these existing solutions do not enforce system-wide access management and rules based on titles, roles, jobs, positions, and/or required tasks. This leads to security breaches that cause damage, loss of data or privacy, and fines. The existing solutions do not provide periodic enforcement of time-based rules to limit access to data and computing resources across different employment groups.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

Figure 1:
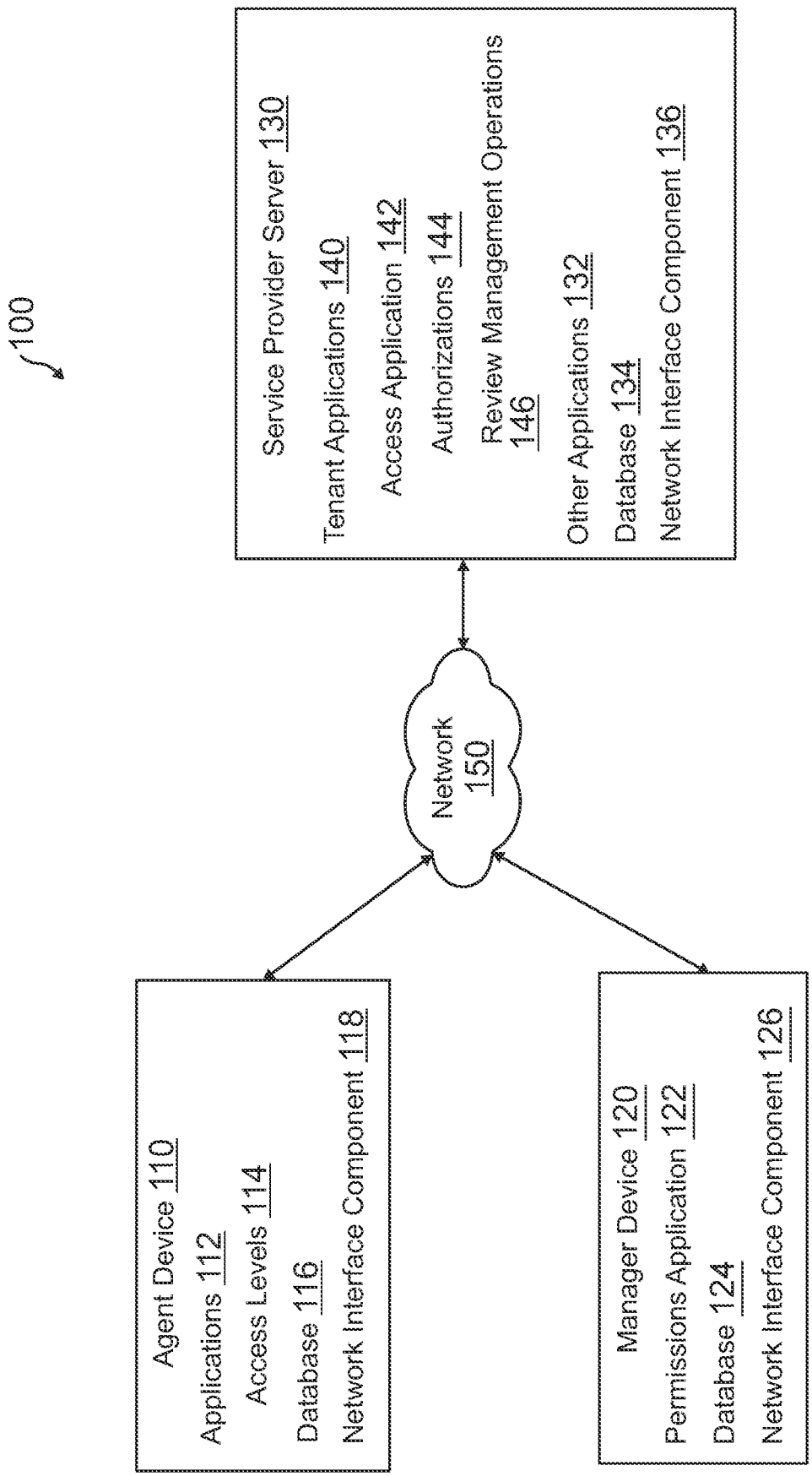
FIG. 1 is a block diagram of a networked cloud computing environment suitable for implementing the processes described herein according to an embodiment.

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a computing system or infrastructure of an organization, methods, data structures, and systems are provided for enforcing time-based user access levels via a review management system. A database system stores different user access levels as they are set and changed over time, which include additions of new employees and their access levels, as well as changes to existing employees that may be temporary or permanent. The access level data may be generated, for example, by authorized employees, human resources, agents, and/or administrators (e.g., managers and supervisors of an organization for the corresponding agents) using client systems or devices. The computing system may include a cloud computing system that include cloud computing tenants corresponding to the organization and its employees. The data may further be generated and/or updated based on changes and/or updates to titles, roles, jobs, positions, and/or required tasks. The term "and/or" as used herein means any of the items in the list, or a combination thereof.

The computing system may provide a processing engine that synchronizes and enforces time-based access rules based on employee status and position, as well as a last login timestamp of the employees or other agents to the computing infrastructure. Employees or agents may correspond to those members in a workforce of the organization, including employees that assist customers and other clients of the organization. Each employee may be associated with a globally unique, universally unique, or other unique identifier (e.g., GUID, UUID, or generally an ID) when initially employed and/or onboarded with the computing system and may further be associated with an ID for their position and/or employment status (e.g., employed, not employed, sabbatical, etc.). A unique login ID allows for tracking of the employee with the organization's computing system over time.

The computing system for review management of user access levels may, at certain time periods or intervals, perform a review and synchronization of user access levels to computing resources, data, login and/or additional authentication, and the like. The computing system may obtain the IDs or other identification of employees. The IDs may be generally obtained for all employees or a specific group of employees (e.g., a subsection of the employees, such as agents for a call center, management, a specific working group, and the like). For each employee, the review management system may then obtain a position ID, an employment status and/or employment status ID, and a last login timestamp to the organization's computing system (or any other sub-system, such as a login to a specific computing system being reviewed). The timestamp may be used to calculate a time between a last login timestamp and a current timestamp when performing the review management of the user access levels.

Thereafter, the review management system may determine one or more time-based access rules for user access levels corresponding to the employees. The rules may be associated with the position ID and the employment status ID, such as rules assigning the level of access different employees have to computing resources and/or data, as well as what computing systems, authentication processes, accounts, and the like are accessible by each employee. If the time period from the last login to the current time violates the rule, and the rule requires a different user access level to be assigned to an employee (e.g., where it may have been temporarily adjusted by a manager to complete a task), then the review management system enforces the rule on the employee's ID, account, and/or login access. This may include revoking access or providing further access, such as if the employee has changed titles or roles, is no longer employed, or the like The embodiments described herein provide methods, computer program products, and computer database systems for time-based user access level enforcement and synchronization in a computing system. A computing system provides for enforcing time-based user access levels may be provided through one or more applications, operations, and/or interfaces that connects with a computing infrastructure for an organization. For example, the online system may provide a portal that is accessible by the hiring personnel, administrators, employees, human resource (HR) departments, and the like, and is used to review and assign user access levels, as well as enforce time-based access rules for different user access levels. The portal may include user interface(s) to establish and update the rules, as well as request delegation, assignment, and/or change of user access levels.

According to some embodiments, in a cloud computing and/or on-premises software system accessible by a plurality of separate and distinct organizations, a review management system is provided for enforcing time-based user access levels, thereby preventing human error and security breaches of computing systems and data for organizations and/or cloud computing tenants.

Example Environment

The system and methods of the present disclosure can include, incorporate, or operate in conjunction with or in the environment of an automation engine, database, and portal, which may include cloud-based computing architecture. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include an agent device 110, a manager device 120, and a service provider server 130 for enforcing time-based user access levels in a computing infrastructure of an organization. In other embodiments, environment 100 may not have all of the components listed and/or may have other elements instead of, or in addition to, those listed above. In some embodiments, environment 100 is an environment in which enforcing time-based user access levels is provided. Agent device 110 and/or manager device 120 may be any machine or system that is used by a user to display user interfaces user and request use of computing resources and/or data in an organization. For example, agent device 110 and/or manager device 120 can be a handheld computing device, a mobile phone, a laptop computer, a notepad computer, a work station, and/or a network of computing devices. As illustrated in FIG. 1, agent device 110 and/or manager device 120 might interact via a network 150 with service provider server 130, which requests data from service provider server 130 and processes received data for display.

Agent device 110 may be utilized in order to access computing services, resources, and/or data via applications 112. An agent is referred to herein as an "agent" or an "employee" of an organization may include those users that assist in sales, help or service assistance, service scheduling, and the like with customers and clients, but may more broadly correspond to any type of member of a workforce. An agent's unique login ID may be provided during a login or authentication process on agent device 110, and the agent may then access computing resources provided by service provider server 130 based on access levels 114. Thus, agent device 110 may correspond to a device, server, or the like that interfaces with service provider server 130 to utilize the services, applications, data storage, and the like of the corresponding computing environment based on access levels 114. Service provider server 130 may receive the unique login ID or other username for the agent, as well as a password or other authentication information, and provide access to computing resources via tenant applications 140, as discuss herein. Thereafter, applications 112 residing locally on agent device 110 may display and utilize tenant applications 140 provided by service provider server 130.

Service provider server 130 may be utilized by different organizations and employees to access and utilize computing resources, as well as synchronize and enforce time-based user access levels. Service provider server 130 may provide computing services via tenant applications 140 and may utilize access application 142 to enforce time-based user access levels. Tenant applications 140 may include applications utilized by an organization that may provide services, data processing, and storage to the organization's employees via agent device 110 and/or manager device 120. Access application 142 may include authorizations 144 for certain access levels, as well as review management operations 146. Service provider server 130 may also include other applications 132 associated with user interface display, data processing or output, data retrieval and/or storage, user interface display and output, server security, and other additional applications for cloud and/or on-premises computing architectures. Manager device 120 may be used to access a permission application 122 and establish authorizations 144. In some embodiments, manager device 120 may also be used to establish rules for time-based user access levels that are enforced by review management operations 146 of access application 142. Manager device 120 may therefore be used to set, synchronize, and/or enforce access levels 114 on agent device 110 based on data input by managers or other employees to permissions application 122

Thereafter, service provider server 130 may provide services to enforce time-based user access levels through access application 142. Access levels 114 are provided to agent device 110 when logging in to an account or other authentication system for access and use of computing services provided through tenant application 140. Access levels 114 may correspond to permissions to access certain content, data, applications, and other computing resources, and may be provided based on authorizations 144. At periodic intervals, such as daily, weekly, monthly, or the like, service provider server 130 may execute access application 142 to review authorizations 144 and utilize review management operations to enforce time-based user access levels of users to particular data and/or computing services. Access application 142 may obtain a list of employees and their corresponding employment status ID and/or position ID. Access application 142 may then determine a time between a last login timestamp and a current timestamp for each employee. Based on rules assigned to the position ID and/or employment status ID, access application 142 may then set user access levels via review management operations 146. This may include adjusting access levels 114 when providing data and/or computing resources to agent device 110 in order to reset or change corresponding access levels to this data and/or computing resources.

The users of agent device 110 and/or manager device 120 may differ in their respective capacities, and the capacity of the employees using agent device 110 and/or manager device 120. These capacities might be entirely determined by applications, permissions, and profiles for a current user, which may be established by time-based user access levels and review management operations 146. For example, where an agent is using a device to interact with service provider server 130, that user system has the capacities allotted to that agent by access levels 114 and those computing events may be associated with an agent. However, where an administrator or manager involved in hiring and/or setting different access levels utilizes manager device 120, that manager device 120 has the capacities allotted to that administrator and may perform actions associated with that administrator and their corresponding user access level(s). Thus, different users may have different capabilities, different permissions, and perform different events, such as by using permissions application 122 to set authorizations 144 with access application 142. Both agent device 110 and manager device 120 may execute a web-based client that accesses a web-based application for service provider server 130, or may utilize a rich client, such as a dedicated resident application, to access service provider server 130.

Agent device 110 and/or manager device 120 may also utilize one or more user interface devices, such as a keyboard, mouse, trackball, touch pad, touch screen, pen or the like, for interacting with a graphical user interface (GUI) (e.g., one or more of user interfaces) provided by an application or browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the service provider server 130 or other systems or servers through the web-based or rich client. For example, the user interface device can be used to access data and applications hosted by service provider server 130, and to perform searches on stored data, and otherwise allow a user to interact with various GUI pages that may be presented to a user. As discussed above, various embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Agent device 110 and/or manager device 120 might communicate via a network interface component 118 and/or network interface component 126, respectively, with service provider server 130 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Similarly, service provider server 130 may communicate with one or more organizations and/or cloud computing tenants, including agent device 110 and/or manager device 120, via a network interface component 136 using the same or similar Internet protocols. In an example where HTTP/HTTPS is used, agent device 110 and/or manager device 120 might include an HTTP/HTTPS client commonly referred to as a "browser" for sending and receiving HTTP//HTTPS messages to and from an HTTP//HTTPS server, such as service provider server 130. Such an HTTP/HTTPS server might be implemented as the sole network interface between agent device 110, manager device 120, and/or service provider server 130, but other techniques might be used as well or instead. In some implementations, the interface between agent device 110, manager device 120, and service provider server 130 includes load sharing functionality.

Agent device 110 and/or manager device 120 may utilize network 150 to communicate with service provider server 130 and/or each other, which is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, service provider server 130 is configured to provide webpages, forms, applications, data, and media content to agent device 110 and/or manager device 120, as well as receive data from agent device 110 and/or manager device 120, including unique IDs for agents, authorizations 144, and/or other permissions or changes to user access levels. As such, service provider server 130 provides one or more security mechanisms to keep data secure. Additionally, the term "system" is meant to include a computer system and/or server(s), including processing hardware and process space(s), and an associated storage system and database application (e.g., object-oriented data base management system (OODBMS) or relational database management system (RDBMS)). It should also be understood that "server system" and "system" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, applications 112 of agent device 110 and/or permissions application 122 of manager device 120, shown in FIG. 1, may correspond to the applications and API services that provide user interfaces (web browser, desktop application, etc.) for an organization and/or member of the organization, such as an agent, employee, staff, officer, HR and/or hiring department, and the like for a company to interact with service provider server 130. Service provider server 130 may execute tenant applications 140 to interact with applications 112 and/or permissions application 122. For example, in one embodiment, service provider server 130 includes application servers configured to implement and execute software applications as well as provide related data, code, forms, webpages, and other information associated with tenant applications 140, and to store to, and retrieve from, a database system related data, objects, and web page content associated with tenant applications 140. For example, service provider server 130 may implement various functions of tenant applications 140, and the processing space for executing system processes, such as running applications as part of tenant applications 140. Additional processes that may execute on service provider server 130 include database indexing processes for time-based user access levels, rules, and/or authorizations 144 used for access to different systems, data, and/or computing services.

Several elements in the system shown in FIG. 1 are explained briefly here. For example, agent device 110 and/or manager device 120 could include a desktop personal computer, workstation, laptop, notepad computer, PDA, cell phone, or any wireless access protocol (WAP) enabled device or any other computing device capable of interfacing directly or indirectly to the Internet or other network connection. Agent device 110 and/or manager device 120 typically runs an HTTP/HTTPS client, e.g., a browsing program, such as Microsoft Internet Explorer® or Edge® browser, Google Chrome® browser, Mozilla Firefox® browser, or a WAP-enabled browser in the case of a cell phone, notepad computer, PDA or other wireless device, or the like. According to one embodiment, each of agent device 110, manager device 120, and/or service provider server 130 and all of its components are configurable using applications including computer code run using one or more central processing unit such as an Intel Pentium® processor or the like. Similarly, service provider server 130 and all of its components might be operator-configurable using application(s) including computer code to run using a central processing unit, which may include an Intel Pentium® processor or the like, and/or multiple processor units. In this regard, service provider server 130 functions may be performed by a greater number of devices and/or servers to form a cloud-based environment to provide online services to cloud computing tenants through cloud computing and cloud-based service delivery. This cloud computing environment therefore may provide and/or improve data processing, storage, and retrieval through networked servers and devices forming the cloud computing environment. A computer program product embodiment includes a machine-readable storage medium (or media) having instructions stored thereon/in which can be used to program a computer to perform any of the processes of the embodiments described herein utilizing one or more computing devices.

Computer code for operating and configuring agent device 110, manager device 120 and/or service provider server 130 to intercommunicate and to process webpages, applications and other data and media content as described herein are preferably downloaded and stored on a hard disk, but the entire program code, or portions thereof, may also be stored in any other volatile or non-volatile memory medium or device corresponding to database 116 of agent device 110, database 124 or manager device 120, and/or database 134 of service provider server 130, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. For example, database 116, database 124, and/or database 134 may store application and system data associated with providing and administering applications 112, permissions application 122, and/or tenant applications 140, respectively. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Computing Environment

Figure 2:
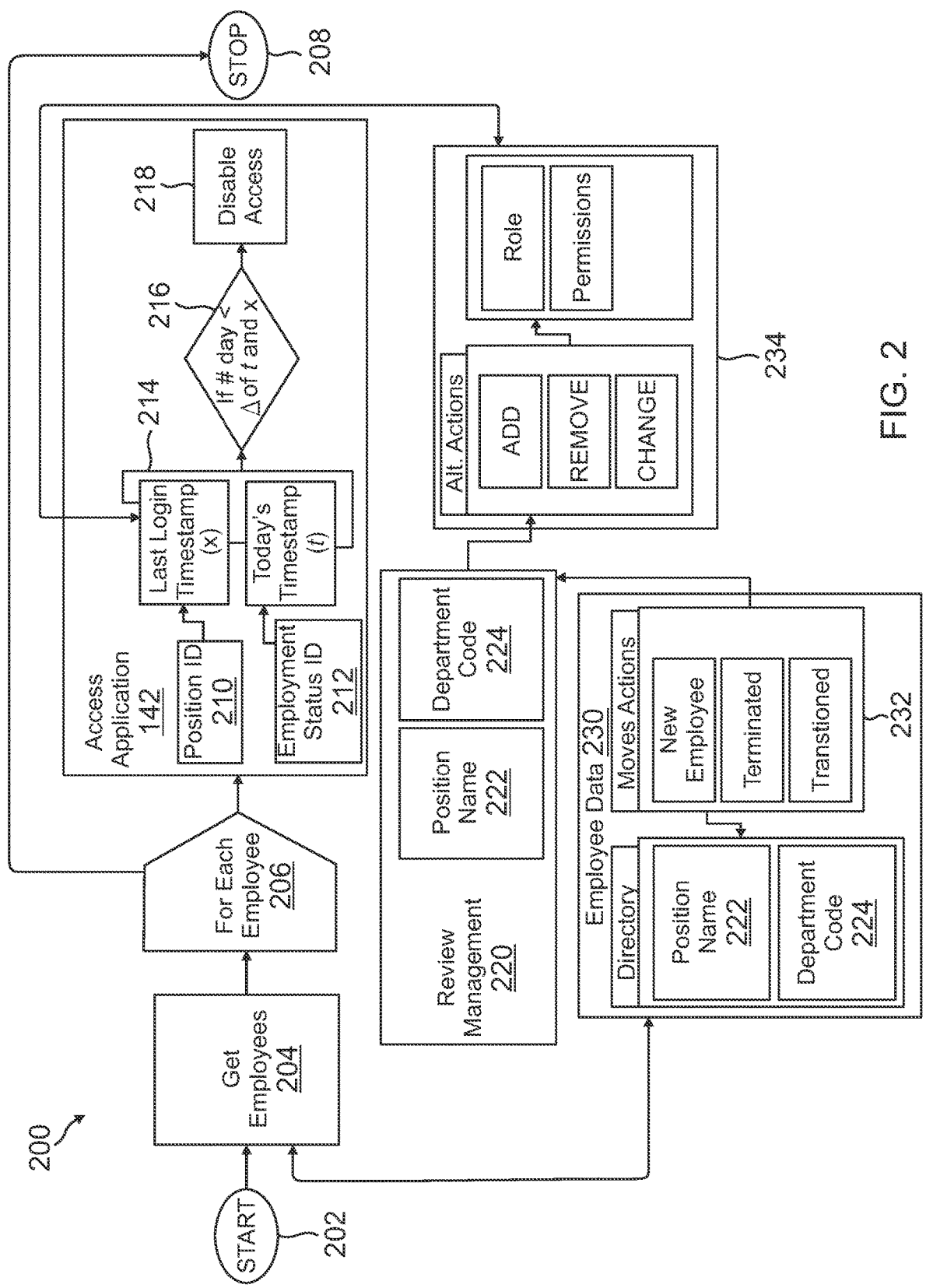
FIG. 2 is a block diagram of enforcement of time-based user access levels in a computing infrastructure of an organization according to an embodiment.

FIG. 2 is a block diagram of enforcement of time-based user access levels in a computing infrastructure of an organization according to an embodiment. Environment 200 of FIG. 2 includes access application 142 executed by service provider server 130, discussed in reference to environment 100 of FIG. 1. In this regard, environment 200 displays a computing environment executing processes to synchronize and enforce user access levels in a time-based manner with a computing infrastructure of an organization.

In environment 200, access application 142 is executed in order to synchronize and enforce time-based user access levels for accounts and other authentication systems of the organization. This includes restricting or setting access to computing resources and/or data provided by an organization's computing infrastructure. This may also include different access provided to cloud computing tenants of a cloud computing system, where the tenants may correspond to the organization and/or employees of the organization. Thus, as a synchronization process 202 to the operations of access application 142, employees 204 are obtained for the organization. Employees 204 may generally correspond to all employees of the organization, or may correspond to a subset of such employees, such as a specific work group, task force, department, position, or the like. For example, employees 204 may be limited to management, workforce agents, or the like. Employees 204 may be obtained by reading employee data 230 from one or more databases of the organization or utilized by the organization. In this regard, employee data 230 may include a directory as a digital representation having a position name 222 for each employee and a department code 224. Employee data 230 further includes moves 232 corresponding to the moves that an employee may have with an organization, such as a new employee title, a terminated title, a transition title, and the like (e.g., vacation, family care leave, sabbatical, etc.). This data allows for determination of the employee's status and position at the organization and is provided as input to access application 142.

For an individual employee 206, access application 142 is then executed with a review management 220 in order to enforce time-based user access levels for individual employee 206. If no employees remain for the analyzed group, then access application 142 executing review management 220 may proceed to a process completion 208. However, in the event that employees remain in employees 204 for enforcing user access levels, access application 142 may execute review management 220 for individual employee 206 to enforce any user access levels that may have been temporarily adjusted to a time-based access. This time-based access may have been provided to provide individual employee 206 with access to some operation, computing resource, application, and/or data, such as to complete a task.

Figure 3:
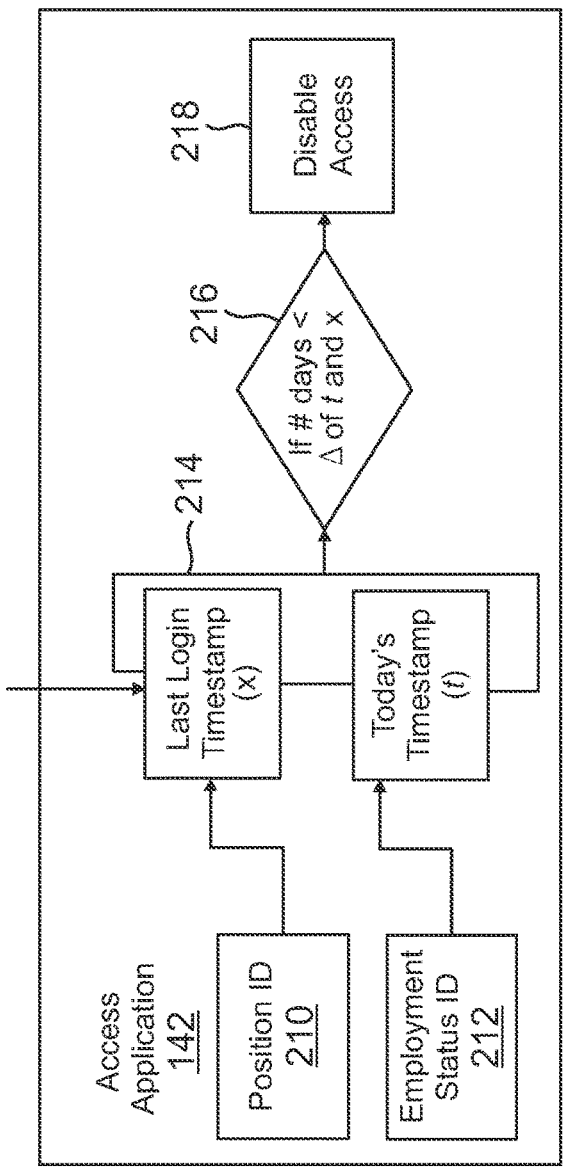
FIG. 3 is a block diagram of a time-based rule being enforced for user access levels based on a position identifier, an employment status, and a login timestamp according to an embodiment.

FIG. 3 is a block diagram of a time-based rule being enforced for user access levels based on a position identifier, an employment status, and a login timestamp according to an embodiment. Environment 300 of FIG. 3 includes access application 142 executed by service provider server 130, discussed in reference to environment 100 of FIG. 1. In this regard, environment 300 displays a further view of access application 142 from environment 200 of FIG. 2 when performing time-based user access level synchronizations.

In environment 300, access application then determines position ID 210 and employment status ID 212 for individual employee 206. Position ID 210 may correspond to a particular role, title, or other job position identifier for individual employee 206. Position ID 210 may be determined using position name 222 and department code 224 for individual employee 206. Further, employment status ID 212 may correspond to the user's current employment status, which may be determined using moves 232 from employee data 230. For example, moves 232 may include employment status such as new employee, terminated, transitioned, and the like (e.g., sabbatical, vacation, temporary employee, family care leave, etc.). Position ID 210 and employment status ID 212 may designate the base and/or standard access level that individual employee 206 is entitled to have from their employment and/or role within the organization. Thus, position ID 210 and employment status ID 212 may be used to reset or otherwise revert user access levels to their standard access levels assigned to the employee and their login ID for their employment.

Access application 142 may then perform a timestamp comparison 214 to determine whether a timestamp between a last login (x) and a current time (t) violates one or more time-based access rules established for position ID 210 and/or employment status ID 212. For example, review management 220 may set one or more time-based access rules as to whether to disable or remove a user's or employee's access rights or permissions to certain computing resources, applications, operations, and/or data. In one embodiment, the rule may dictate that if the time between the last login and the current timestamp is less than a certain time period (e.g., 90 days), then the user may be deemed to be active and using the organization's computing infrastructure during employment. In such an embodiment, time-based access rule 216 may then perform a disable access operation 218 with individual user 206's access levels to disable an access level, right, or permission that is not provided to individual user 206 based on position ID 210 and/or employment status ID 212. For example, the access levels and permissions provided to individual employee 206 may be reset to a base and/or standard level of permissions that individual employee 206 may be assigned for their employment. If a last login exceeds the rule time period, the user may be considered to be on vacation or otherwise not using the login and authentication system for access and permissions to the organization's computing infrastructure. Thus, the access levels may not be disabled or changed. However, other time-based rules may also allow for disabling of certain access levels and/or permissions. For example, another rule may disable access when a time since a last login exceeds a time period, such as if the user is inactive and does not require such permissions. Other rules may limit temporary access by individual employee 206 or other employees to certain resources, data, and/or services, such as if one of the employees if assisting another department and requires the temporary access.

Enforcement of time-based access rules allows for automatic disabling of certain user access levels that may have been temporarily adjusted for individual employee 206. Returning to environment 200 of FIG. 2, other employees, such as HR staff and/or managers may also manually enable and/or disable certain user access levels by adding rules or other permissions to alternative actions 234. Alternative actions 234 are used by review management 220 for individual employee 206 and/or with position name 22 and/or department code 224. For example, alternative actions 234 may be used by employees and the like of an organization to perform actions with review management 220 that change user access levels temporarily or permanently with respect to one or more employees. A manager may want to temporarily assign an employee with a certain access level to complete a task, which the organization would like to later revert so that any risk or compliance rules are not violated, and data remains secure. In other embodiments, a user may be assigned a particular access level that different from their position and/or employment status when the user may require the access level for their specific job and/or tasks on a permanent basis. Thus, alternative actions 234 may provide for operations to add, remove, and/or change user access levels, as well as assign specific roles and/or permissions to employees and/or based on positions in the company. This allows for review management 220 to be configurable by employees of the organization in a time-based manner that automatically updates assigned permissions and access levels for data security and compliance.

Figure 4A:
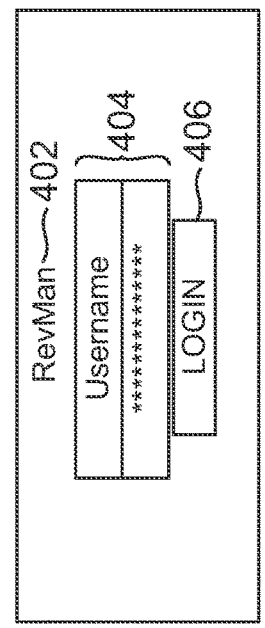
FIG. 4A is a simplified diagram of a user interface used to permit user access to data and computing resources according to some embodiments.

FIG. 4A is a simplified diagram of a user interface used to permit user access to data and computing resources according to some embodiments. A user interface 400a displays a login screen to a review management (RevMan) system 402. For example, user interface 400a may be accessed by a user of an organization, such as an employee, manager, HR staff, or the like that may want to establish and/or change user access levels, as well as establish time-based access rules for enforcing user access levels across the organization. In this regard, user interface 400a may be displayed when accessing a portal for RevMan system 402. Thereafter, authentication information 404 may be entered, such as a login name and password. Additional authentication information may also be required in some embodiments, such as a specific company identifier, PIN, or password that may be required to verify that the user has permission to access RevMan system 402. Once proper data is entered, a login 406 may be executed to view a user interface 400b in FIG. 4B.

Figure 4B:
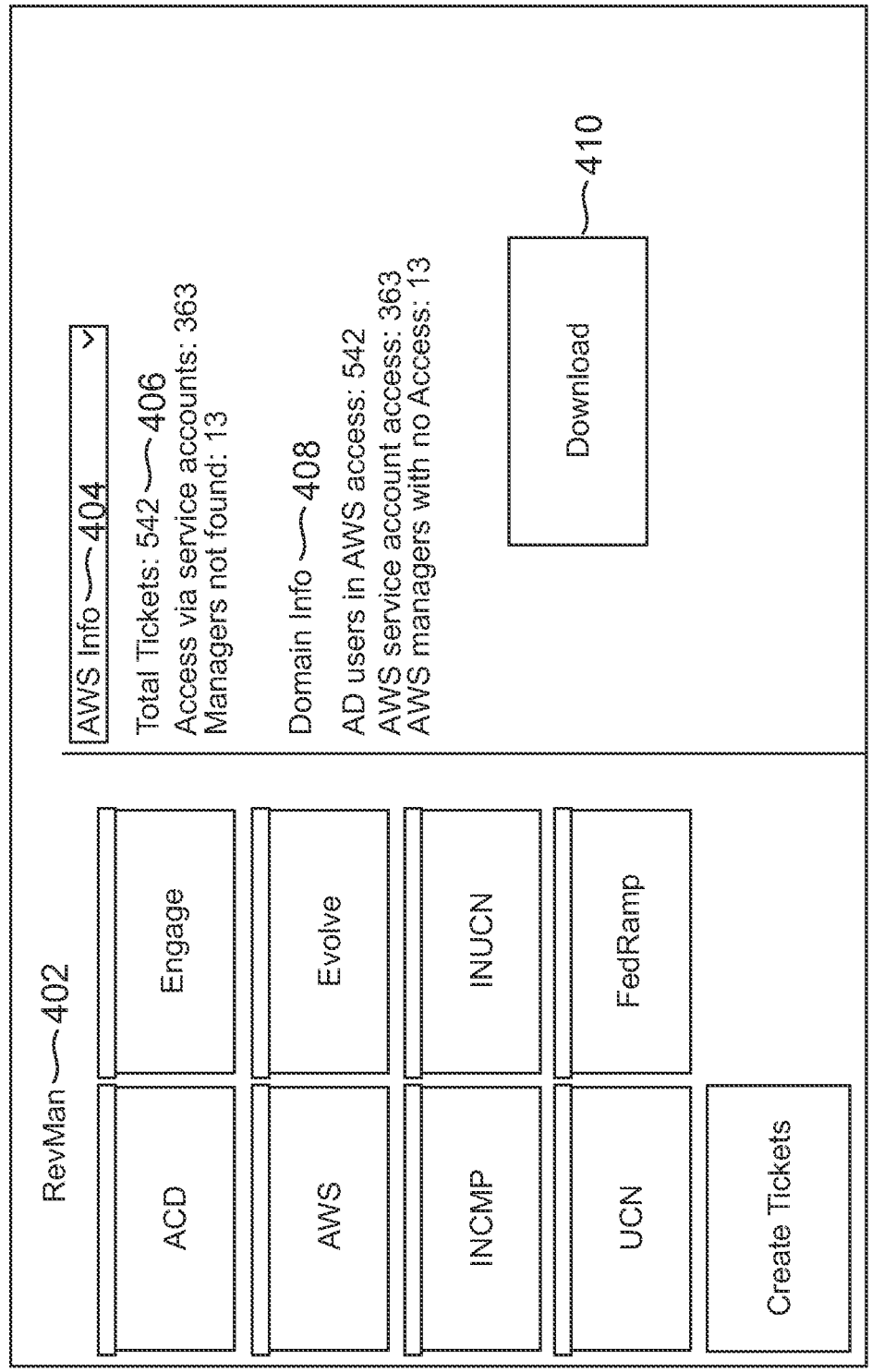
FIG. 4B is a simplified diagram of a user interface when enforcing time-based user access levels via a review management system according to some embodiments.

FIG. 4B is a simplified diagram of a user interface when enforcing time-based user access levels via a review management system according to some embodiments. User interface 400b includes data output by RevMan system 402 when viewing execution of rules for time-based user access levels and changes with one or more employees of an organization. The boxes shown to the left and under RevMan system 402 may display metadata determined by RevMan 402. This may include time-based access rules that a manager may be required to review and verify for the employees of the manager. Under AWS information 404, additional information is shown for user access levels and corresponding tickets used to provide access to employees via their login IDs and/or accounts. This includes information for a total number 406 of outstanding tickets for user access levels, as well as domain information 408 for a particular domain of interest and the tickets or other data for user access levels in that domain. This allows a review management user or administrator to view the number of accesses and/or user access levels assigned to different service accounts, as well as errors in access, such as managers not found and/or not provided access. A download button 410 may also be provided via user interface 400b in order to download and view data shown in user interface 400b to offline local device storage (e.g., temporary or permanent device storage).

Figure 5:
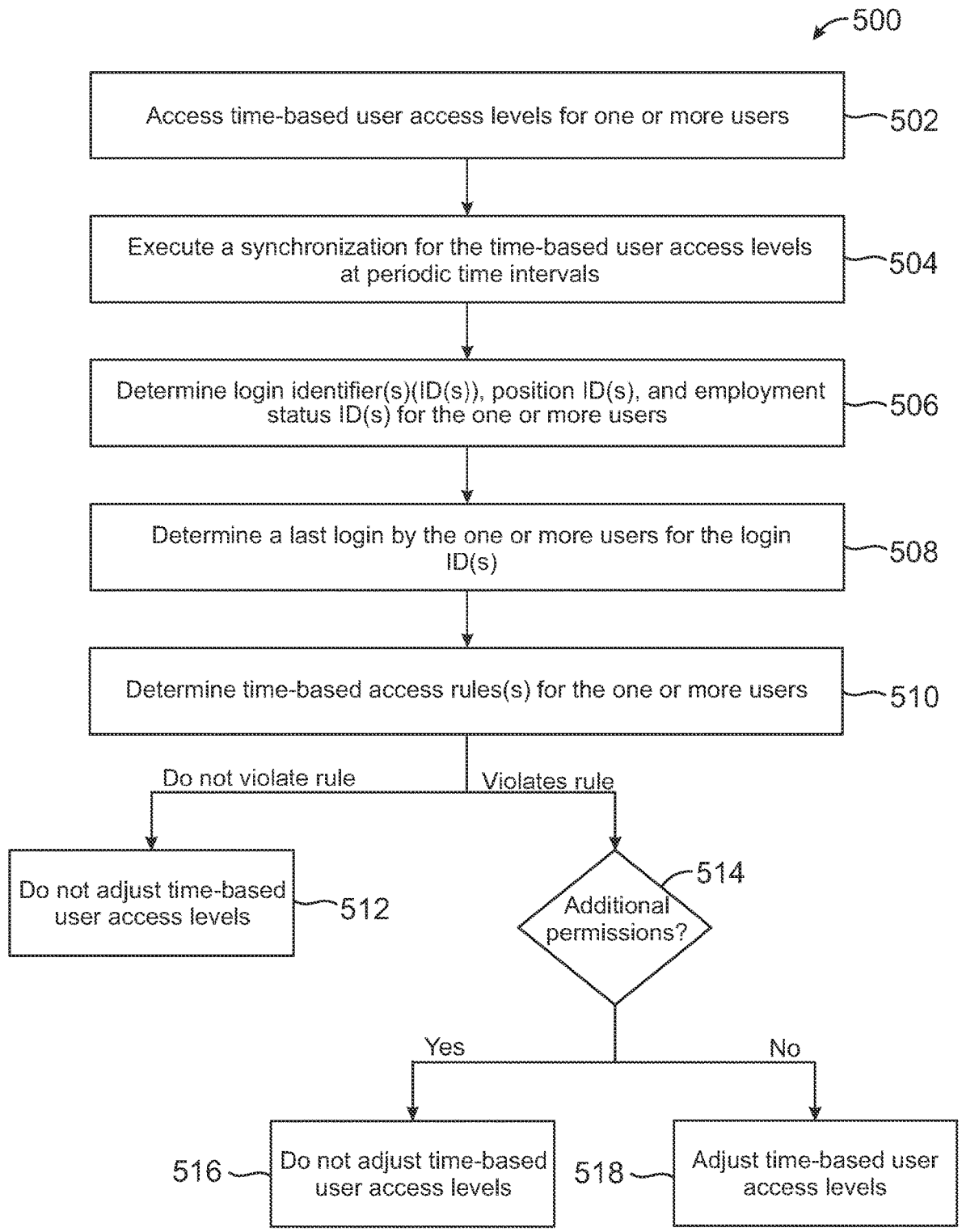
FIG. 5 is a simplified diagram of a method for enforcing time-based user access levels in a computing infrastructure of an organization according to some embodiments.

FIG. 5 is a simplified diagram of a method for enforcing time-based user access levels in a computing infrastructure of an organization according to some embodiments. Note that one or more steps, processes, and methods described herein of method 500 may be omitted, performed in a different sequence, or combined as desired or appropriate. In some embodiments, enforcing time-based user access levels based on rules described in method 500 of FIG. 5 can be implemented and performed using service provider server 130. One or more of the steps 502-518 of method 500 may be implemented, at least in part, in the form of executable code stored on non-transitory, tangible, machine-readable media that when run by one or more processors may cause the one or more processors to perform one or more of the steps 502-518. In some embodiments, method 500 can be performed by one or more computing systems in environment 100 of FIG. 1.

At step 502 of method 500, time-based user access levels are accessed for one or more users. The one or more users may correspond to employees in an organization or company, which may include all employees or a specific subgroup of employees. The time-based user access levels may be temporary and/or permanent access levels assigned to users based on their login IDs or other unique IDs. These user access levels may be established to provide users with access to certain permissions, computing resources, applications and computing operations, data, and the like within a computing infrastructure for the organization. Temporary access levels may be provided to one or more users for temporary access to these computing resources, while permanent access levels may be established for particular positions, roles, or groups in the organization. At step 504, a synchronization for the time-based user access levels is executed at periodic time intervals. The synchronization is executed in order to revert the user(s) access level to their base or standard level or amount of permissions, which assists in securing data at the organization and preventing malicious, fraudulent, or accidental misuse of computing resources. This may also assist with compliance standards, rules, or regulations.

At step 506, login ID(s), position ID(s), and employment status ID(s) for the one or more users are determined. For example, a login ID may be the information or ID that allows identification of a user with the organization's computing infrastructure, such as when accessing computing resources based on access levels provided to the user. A position ID and employment status ID may then be tied to the user's current employment at the organization, which may include a job title or role, as well as a current employment status. The IDs for each user may be accessed from a database and/or digital directory for the organization and may be determined from one or more database lookups and queries.

The IDs for each user may be accessed so that a processing job may be executed to synchronize and enforce time-based user access levels based on rules established for the organization and/or employees and users within the organization.

At step 508, a last login by the one or more users for the login ID(s) is determined. This may correspond to a last time the corresponding user for a login ID has used the organization's computing resources and/or performed an authentication to access computing resources using their assigned user access levels. Thereafter, a timestamp of the last login is determined and compared to a current timestamp at a time of performing the synchronization. By comparing the timestamps, a review management system for the synchronization may determine if the user has been active or inactive with the computing infrastructure of the organization. At step 510, time-based access rule(s) for the one or more users are determined. A time-based access rule may be specific to the position ID and the employment status ID of the particular users, or may be shared between multiple users and/or across the organization. In this regard, a time-based access rule may correspond to a timeframe or time period that is compared to the time period from the last login to the current time. Thus, the time-based access rule may limit or revert time-based user access levels based on the user's activity and/or inactivity. For example, if a user has recently logged in and is active, the time-based access rule may revert user access levels to protect data security.

Thus, the time period since the last login is then compared to the time-based access rule to determine if the time-based access rule is exceeded or violated. If not violated, method 500 proceeds to step 512 where time-based user access levels are no adjusted. This means that the user's access levels comply with the corresponding rules and/or assignments to the user's position ID and employment status ID. However, if the rule is violated, at step 514, additional permissions for the position ID and/or employment status ID are determined. The additional permissions may be established by a manager, supervisor, or the like and may designate that a specific user is provided a permission to a specific time-based user access level. If there after additional permissions, at step 516, method 500 proceeds to not adjust the time-based user access levels. This means that the user's time-based user access levels are in compliance with the rules of the review management system. However, if no permissions exist, method 500 proceeds to step 518 where time-based user access levels are adjusted and set back to the user access level(s) assigned to the position ID and/or employment status ID. At step 518, the review management system determines that the time-based user access levels for the user's login ID is not in compliance with the position ID and/or employment status ID. Thus, reverting the user's time- based user access levels is performed to secure data and meet compliance requirements for data and computing resource security.

As discussed above and further emphasized here, FIGS. 1, 2, 3, 4, and 5 are merely examples of service provider server 130 and corresponding methods for enforcing time-based user access levels in a computing infrastructure of an organization, which examples should not be used to unduly limit the scope of the claims. One of ordinary skill in the art would recognize many variations, alternatives, and modifications.

Figure 6:
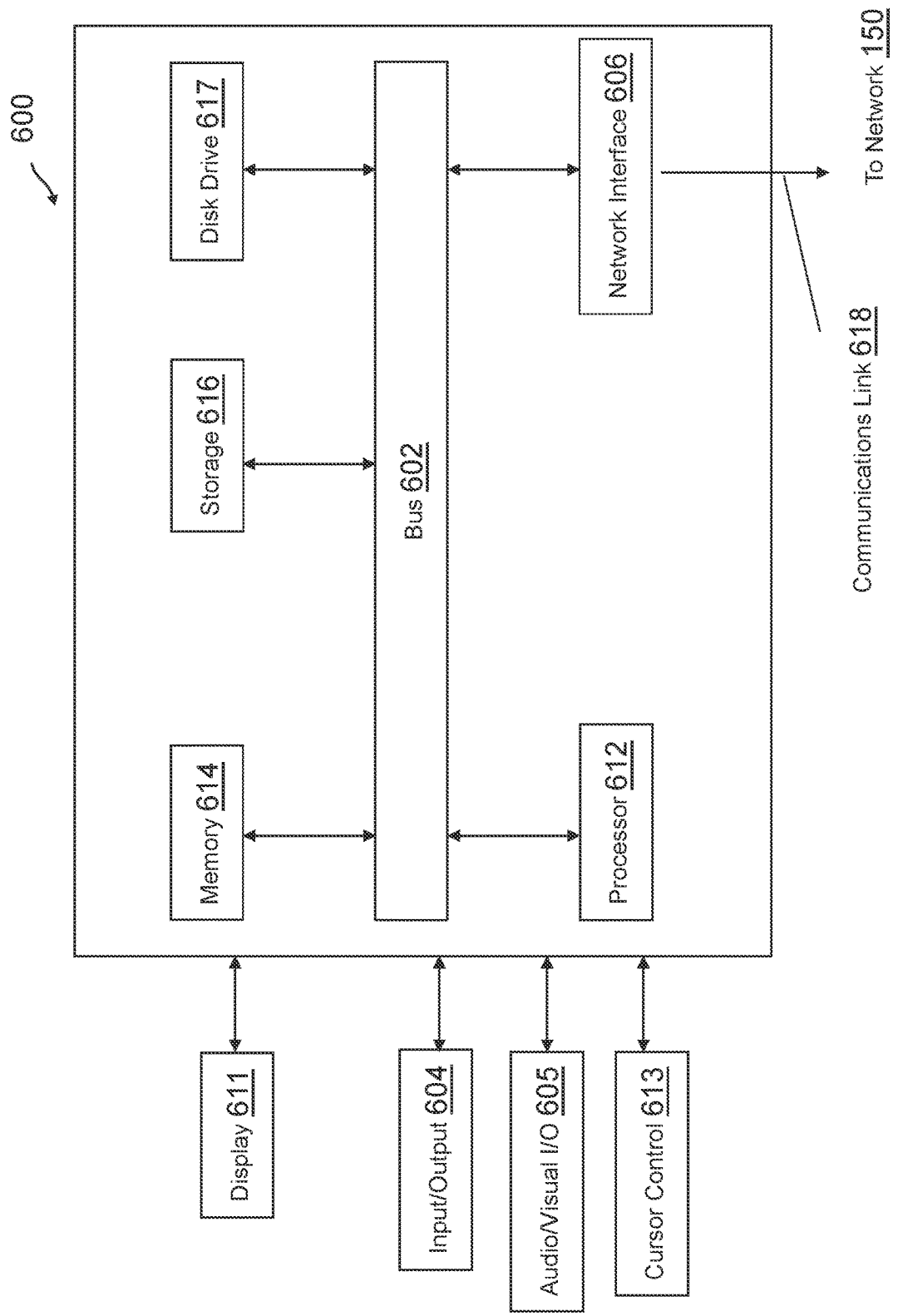
FIG. 6 is a simplified diagram of a computing device according to some embodiments.

FIG. 6 is a block diagram of a computer system suitable for implementing one or more components in FIGS. 1, 2, and/or 3, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 150. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A review management system configured to enforce time-based user access levels in a computing infrastructure of an organization, the review management system comprising:
a processor and a computer readable medium operably coupled thereto, the computer readable medium comprising a plurality of instructions stored in association therewith that are accessible to, and executable by, the processor, to perform access level synchronization operations which comprise:
executing a synchronization of the time-based user access levels for the computing infrastructure of the organization;
obtaining, based on the synchronization, a first login identifier (ID) of a plurality of login IDs for a group of employees of the organization;
identifying a position ID and an employment status ID for the first login ID;
determining a current time and a last login timestamp for the first login ID with the computing infrastructure;
determining a time-based access rule for the group of employees that enforces the time-based user access levels with the organization;
determining whether a time period from the last login timestamp to the current time violates the time-based access rule; and
setting, for the synchronization of the first login ID, at least a first access level of the first login ID to computing resources of the computing infrastructure based on the position ID, the employment status ID, and the determining whether the time period violates the time-based access rule.

2. The review management system of claim 1, wherein the position ID is assigned the first access level, and wherein the setting comprises revoking, for the first login ID, at least one of the first access level or a permission to a second access level provided to the first login ID prior to the synchronization.

3. The review management system of claim 2, wherein the revoking comprises completely revoking both the first access level and the permission in response to the employment status ID indicating that an employee associated with the first login ID is no longer employed at the organization.

4. The review management system of claim 2, wherein the revoking comprises partially revoking the permission to the second access level for the first login ID in response to the employment status ID indicating that an employee associated with the first login ID is employed at the organization and the time period violating the time-based access rule.

5. The review management system of claim 2, wherein before the executing the synchronization, the access level synchronization operations further comprise:
receiving, from a manager login ID, a request to permit access by the first login ID to the second access level; and
establishing, with the computing resources of the computing infrastructure, the permission to the second access level for the first login ID.

6. The review management system of claim 1, wherein the position ID is assigned the first access level, and wherein the setting comprises retaining, for the first login ID, the first access level and a permission to a second access level provided to the first login ID prior to the synchronization in response to the employment status ID indicating that an employee associated with the first login ID is employed at the organization and a request to extend access to the second access level by the first login ID beyond the synchronization.

7. The review management system of claim 1, wherein before the executing the synchronization, the access level synchronization operations further comprise:
receiving an initial configuration of the plurality of login IDs for the group of employees, wherein the initial configuration identifies the first access level for assignment to the plurality of login IDs;
establishing, based on the initial configuration, the first access level for the plurality of login IDs; and
providing a user interface for at least one manager ID to establish permissions for the plurality of login IDs to a plurality of additional access levels.

8. The review management system of claim 1, wherein data for the time-based user access levels and the access level synchronization operations reside in a cloud-based computing environment utilized by the organization, wherein at least a portion of the computing infrastructure of the organization is provided by the cloud-based computing environment, and wherein the organization comprises a cloud computing tenant of the cloud-based computing environment.

9. A method to enforce time-based user access levels for a computing infrastructure of an organization, the method comprising:
   executing a synchronization of the time-based user access levels for the computing infrastructure of the organization;
   obtaining, based on the synchronization, a first login identifier (ID) of a plurality of login IDs for a group of employees of the organization;
   identifying a position ID and an employment status ID for the first login ID;
   determining a current time and a last login timestamp for the first login ID with the computing infrastructure;
   determining a time-based access rule for the group of employees that enforces the time-based user access levels with the organization;
   determining whether a time period from the last login timestamp to the current time violates the time-based access rule; and
   setting, for the synchronization of the first login ID, at least a first access level of the first login ID to computing resources of the computing infrastructure based on the position ID, the employment status ID, and the determining whether the time period violates the time-based access rule.

10. The method of claim 9, wherein the position ID is assigned the first access level, and wherein the setting comprises revoking, for the first login ID, at least one of the first access level or a permission to a second access level provided to the first login ID prior to the synchronization.

11. The method of claim 10, wherein the revoking comprises completely revoking both the first access level and the permission in response to the employment status ID indicating that an employee associated with the first login ID is no longer employed at the organization.

12. The method of claim 10, wherein the revoking comprises partially revoking the permission to the second access level for the first login ID in response to the employment status ID indicating that an employee associated with the first login ID is employed at the organization and the time period violating the time-based access rule.

13. The method of claim 10, wherein before the executing the synchronization, the method further comprises:
   receiving, from a manager login ID, a request to permit access by the first login ID to the second access level; and
   establishing, with the computing resources of the computing infrastructure, the permission to the second access level for the first login ID.

14. The method of claim 9, wherein the position ID is assigned the first access level, and wherein the setting comprises retaining, for the first login ID, the first access level and a permission to a second access level provided to the first login ID prior to the synchronization in response to the employment status ID indicating that an employee associated with the first login ID is employed at the organization and a request to extend access to the second access level by the first login ID beyond the synchronization.

15. The method of claim 9, wherein before the executing the synchronization, the method further comprises:
   receiving an initial configuration of the plurality of login IDs for the group of employees, wherein the initial configuration identifies the first access level for assignment to the plurality of login IDs;
   establishing, based on the initial configuration, the first access level for the plurality of login IDs; and
   providing a user interface for at least one manager ID to establish permissions for the plurality of login IDs to a plurality of additional access levels.

16. The method of claim 9, wherein data for the time-based user access levels resides in a cloud-based computing environment utilized by the organization, wherein at least a portion of the computing infrastructure of the organization is provided by the cloud-based computing environment, and wherein the organization comprises a cloud computing tenant of the cloud-based computing environment.

17. A non-transitory computer-readable medium having stored thereon computer-readable instructions executable to enforce time-based user access levels for a computing infrastructure of an organization, the computer-readable instructions executable to perform access level synchronization operations which comprises:
   executing a synchronization of the time-based user access levels for the computing infrastructure of the organization;
   obtaining, based on the synchronization, a first login identifier (ID) of a plurality of login IDs for a group of employees of the organization;
   identifying a position ID and an employment status ID for the first login ID;
   determining a current time and a last login timestamp for the first login ID with the computing infrastructure;
   determining a time-based access rule for the group of employees that enforces the time-based user access levels with the organization;
   determining whether a time period from the last login timestamp to the current time violates the time-based access rule; and
   setting, for the synchronization of the first login ID, at least a first access level of the first login ID to computing resources of the computing infrastructure based on the position ID, the employment status ID, and the determining whether the time period violates the time-based access rule.

18. The non-transitory computer-readable medium of claim 17, wherein the position ID is assigned the first access level, and wherein the setting comprises revoking, for the first login ID, at least one of the first access level or a permission to a second access level provided to the first login ID prior to the synchronization.

19. The non-transitory computer-readable medium of claim 18, wherein the revoking comprises completely revoking both the first access level and the permission in response to the employment status ID indicating that an employee associated with the first login ID is no longer employed at the organization.

20. The non-transitory computer-readable medium of claim 18, wherein the revoking comprises partially revoking the permission to the second access level for the first login ID in response to the employment status ID indicating that an employee associated with the first login ID is employed at the organization and the time period violating the time-based access rule.

* * * * *